(12) United States Patent
Widner (10) Patent No.: US 6,199,575 B1
(45) Date of Patent: *Mar. 13, 2001

(54) MINIATURE COMBINATION VALVE AND PRESSURE TRANSDUCER SYSTEM

(76) Inventor: Ronald D. Widner, 2811 Pasatiempo Glen, Escondido, CA (US) 92025

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,379

(22) Filed: Dec. 28, 1998

Related U.S. Application Data (63) Continuation-in-part of application No. 08/494,159, filed on Jun. 23, 1995.

(51) Int. Cl.[7] .................................................... B60C 23/04
(52) U.S. Cl. .................... 137/227; 73/146.5; 340/447; 137/557
(58) Field of Search .................... 137/227, 557, 137/234.5; 73/146.5, 146.8, 754, 755; 340/447

(56) References Cited

U.S. PATENT DOCUMENTS

| | | |
|---|---|---|
| 2,727,221 * | 12/1955 | Sprigg .......................... 340/447 |
| 3,031,591 | 4/1962 | Cary et al. . |
| 3,697,917 | 10/1972 | Orth et al. . |
| 4,097,075 | 6/1978 | Clayton . |
| 4,177,671 | 12/1979 | Ichihara et al. . |
| 4,562,874 | 1/1986 | Scheller . |
| 4,567,460 | 1/1986 | Gebler . |
| 4,686,855 | 8/1987 | Smith . |
| 4,695,823 | 9/1987 | Vernon . |
| 4,734,674 | 3/1988 | Thomas et al. . |
| 4,737,760 | 4/1988 | Huang et al. . |
| 4,819,868 | 4/1989 | Fornasori . |
| 4,901,747 | 2/1990 | Yabor . |

(List continued on next page.)

FOREIGN PATENT DOCUMENTS

96/26076 * 8/1996 (WO) ................................. 73/146.8

OTHER PUBLICATIONS

*BiCMOS Integrated Circuit for Capacitive Pressure Sensors in Automotive Applications*, Ph. Dondon, Ch. Zardini and J.L. Aucoutuner, Sensors and Actuators, A. 27–38, pp. 596–599, 1993.

*Surface Micromachined Pressure Sensors with Integrated CMOS Read–Out Electronics*, H. Dudaicevs, M. Kandler, Y. Manoli, W. Mokwa and E. Spiegel, Sensors and Actuators, A. 43, pp. 157–163, 1994.

*A Very Low–Cost Pressure Sensor with Extremely High Sensitivity*, Csaba Csiszár and Gábor Harsányi, Sensors and Actuators, A. 41–42, pp. 417–420, 1994.

*A System for Passive Implantable Pressure Sensors*, Lars Rosengren, Pelle Rangsten, Ylva Bäcklund and Bertil Hök, Sensors and Actuators, A. 43, pp. 55–58, 1994.

(List continued on next page.)

Primary Examiner—John Rivell
Assistant Examiner—Meredith H. Schoenfeld
(74) Attorney, Agent, or Firm—Brown, Martin, Haller & McClain, LLP (57) ABSTRACT

A valve system includes a movable microelectromechanically structured (MEMS) pressure sensor that not only senses pressure but also functions as a mechanical actuator for the valve. An alternative valve system includes a MEMS pressure sensor that extends through an aperture in a curved wall, such as a curved wall of a valve body or a valve core, at an oblique angle to allow it be securely mounted in the confined space of an automotive-type tire inflation valve. The valve system includes a transmitter integrated with the valve and a receiver located at a remote location, such as the passenger compartment of an automobile.

21 Claims, 7 Drawing Sheets

U.S. PATENT DOCUMENTS

| | | |
|---|---|---|
| 4,909,074 | 3/1990 | Gerresheim et al. . |
| 4,918,423 | 4/1990 | Fukuyama et al. . |
| 4,951,501 | 8/1990 | MacAnally et al. . |
| 4,951,502 | 8/1990 | Dörfler et al. . |
| 4,998,092 | 3/1991 | Ohno et al. . |
| 5,027,848 | 7/1991 | Leeuwen . |
| 5,040,561 | 8/1991 | Achterholt . |
| 5,040,562 | 8/1991 | Achterholt . |
| 5,193,387 | 3/1993 | Hodate . |
| 5,289,160 | 2/1994 | Fiorletta . |
| 5,325,886 * | 7/1994 | Klink ................................ 137/227 |
| 5,635,649 | 6/1997 | Tobita et al. . |
| 5,711,302 | 1/1998 | Lampropoulos et al. . |
| 5,774,048 * | 6/1998 | Achterholt ........................ 340/447 |
| 6,005,480 * | 12/1999 | Banzhof et al. ................... 340/447 |

OTHER PUBLICATIONS

*A Thick–Film Pressure Transducer for Cars Propelled by Natural Gas*, L. Fraigi, D. Lupi and L. Malatto, Sensors and Actuators, A. 41–42, pp. 439–441.

*A Micromachined Pressure Sensor with Fiber–Optic Interferometric Readout*, M.A. Chan, Sensors and Actuators, A. 43, pp. 196–201, 1994.

*Capacitive Sensors: When and How to Use Them*, Robert Puers, Sensors and Actuators, A. 37–38, pp. 93–105, 1993.

*A Low Power Multi–Sensor Interface for Injectable Microprocessor–Based Animal Monitoring System*, P. Wouters, M. De Cooman, D. Lapadatu and R. Puers, Sensors and Actuators, A. 41–42, pp. 198–206, 1994.

*A Low Power Multi–Channel Sensor Interface for Use in Digital Telemetry*, B. Puers, P. Wouters and M. De Cooman, Sensors and Actuators, A. 37–38, pp. 260–267, 1993.

*Novel Optical Fibre/Microresonator Interfacing Technology*, A. J. Jacobs–Cook and M.E.C. Bowen, Sensors and Actuators, A. 37–38, pp. 540–545, 1993.

*Silicon Sensors—Merging of Microstructures and Microcircuits*, Randy Frank, Microelectronics Manufacturing Technology, pp. 32–37, Dec., 1991.

Preliminary ad sheet for NPP Series Surface Mount Pressure Sensor NPP–301. 2 pgs. Lucas NovaSensor.

* cited by examiner

MINIATURE COMBINATION VALVE AND PRESSURE TRANSDUCER SYSTEM

CROSS-REFERENCE TO RELATED APPLICATION

This is a continuation-in-part of application Ser. No. 08/494,159, filed Jun. 23, 1995, incorporated herein by reference.

BACKGROUND OF THE INVENTION

1. Field of the Invention

The present invention relates generally to electronic pressure measurement devices and, more specifically, to a miniature valve system that includes an integral pressure transducer.

2. Description of the Related Art

A pressure transducer is a device that produces an electric signal in response to a pressure of a gas or liquid. Following the general trend toward miniaturization of electronic components, pressure measurement devices have been produced that include the transducer itself plus associated electronic components needed to produce a useful output signal co-fabricated on a monolithic integrated circuit chip. Such a pressure measurement device is a type of microelectromechanical structure (MEMS). MEMS technology involves producing integrated micro devices or systems that combine electronic components formed on the semiconductor substrate and three-dimensional mechanical components fabricated in the substrate. Sensors and actuators are the primary categories of MEMS devices that have been developed and can range in size from micrometers to millimeters. MEMS devices are fabricated using integrated circuit (IC) lithographic processing as well as micromachining. Micromachining processes include mask-based wet and dry etching and maskless processes such as focused ion beam etching (FIB), laser machining, ultrasonic drilling, and electrochemical discharge machining (EDM) that produce high aspect-ratio features in the substrate.

Examples of MEMS pressure measurement devices are disclosed in M. Schuenemann, et al., "A Highly Flexible Design and Production Framework for Modularized Microelectromechanical Systems," Micromachine Devices, Vol. 3, March 1998. One such device integrates signal processing, a microcontroller, nonvolatile memory and a bus interface, and is packaged in a co-fired ceramic box with top and bottom ball-grid array contacts. MEMS pressure measurement devices of the type disclosed by Schuenemann et al. are not well-suited for installation in small, confined spaces and through apertures because their packages are relatively large.

U.S. Pat. No. 4,695,823, issued to Vernon, suggests incorporating an apparently unpackaged integrated circuit-based pressure transducer in an automotive tire valve. The integrated circuit includes a transmitter that telemeters measured pressure to a remote display unit. The integrated circuit chip is presumably connected to other circuit elements in the conventional manner of an integrated circuit, i.e., by bonding extremely fine wires between microscopic pads on the chip. Such an arrangement would be impractical because fine wires are likely to break under the stresses to which tires and their valves are typically subjected. Moreover, a pressure transducer chip mounted inside a tire valve in any manner similar to that in which an integrated circuit chip is conventionally mounted in a circuit package would similarly subject the chip to stresses to which the chip would respond by producing erroneous output.

It would be desirable to provide an electronic pressure measurement device that can be economically manufactured and included in, for example, an automotive tire valve with minimal likelihood of failure under normal operating conditions and with minimal deviation from industry tire valve standards. These problems and deficiencies are addressed by the present invention in the manner described below.

SUMMARY OF THE INVENTION

In one respect, the present invention relates to an apparatus combining the features of a mechanical structure operable by a user with a movable microelectromechanically structured (MEMS) pressure sensor that not only senses pressure but also functions as a mechanical actuator for that structure. For example, in an illustrated embodiment of the invention, the mechanical structure is included in a valve, and the movable MEMS not only senses pressure but also opens and closes the valve. In another respect, the present invention relates to a similar MEMS pressure sensor that extends through an aperture in a curved wall, such as a curved wall of a valve body, at an oblique angle to allow it be securely mounted within confined spaces.

In an illustrated embodiment of the invention, the mechanical structure is a valve core of an automotive tire inflation valve. The MEMS sensor extends through an aperture in the barrel of the valve core at an oblique angle, thereby allowing the sensor to fit within the confines of the valve core.

In an alternative but similar embodiment, the MEMS sensor is a movable elongated rod-like member that is disposed generally coaxially within the valve core. In using a conventional valve core, a user, by manually or with the aid of an inflation nozzle depressing an enlarged head at the proximal end of a metal rod or pin that extends coaxially within the valve core, causes the valve cup at the distal end of this actuating pin to unseat itself and thereby open the valve. In contrast, using this embodiment of the invention, the user, causes the MEMS pressure sensor itself to similarly move in an axial direction and unseat the valve cup at its distal end. The MEMS should be made of a suitably strong semiconducting substrate, such as silicon, to enable it to perform these dual functions of sensing pressure within the structure and mechanically actuating the structure.

Embodiments of the present invention may include a transmission circuit that transmits a signal responsive to the measured pressure to a remote location. For example, the measured pressure may be received by a handheld receiver or a receiver mounted in the passenger compartment of an automobile to alert the driver or maintenance personnel of pressure conditions in the tires. The transmission circuit may be formed on the MEMS along with the pressure transducer and its associated circuitry. In a valve core embodiment of the invention, the antenna of such a transmitter may be electrically coupled to the distal end of the MEMS and extend axially away from the valve cup.

The present invention provides electronic pressure measurement in extremely confined spaces, such as the interior of an automotive tire valve core, by integrating the pressure transducer with its associated circuitry in a MEMS and integrating the MEMS in a novel manner within the structure. Mounting the MEMS in a manner in which the MEMS is itself a part of the structure that the user uses to mechanically actuate the structure further promotes integration into such confined spaces and enhances manufacturability.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF PREFERRED EMBODIMENTS

Figure 1:
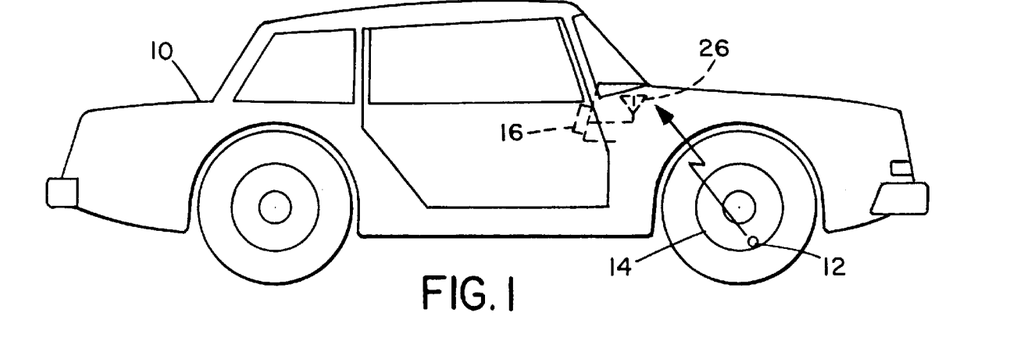
FIG. 1 is a diagrammatic illustration of a tire pressure measurement system in accordance with the present invention in an automobile.

As illustrated in FIG. 1, a remote pressure-monitoring transducer valve system may be used in an automobile 10 or other vehicle or machine having inflation valves, such as a truck, bus, cart, bicycle, motorcycle or aircraft. The system includes a transducer valve 12 mounted on each of one or more rims 14 of the automobile's tires 15 and a receiver unit 16 mounted in the automobile passenger compartment. As described below in further detail, transducer valve 12 measures the air pressure within the tire 15 and transmits a value representing the measured pressure to receiver unit 16, which provides a suitable indication, such as a numerical pressure measurement or an overinflation or underinflation alarm signal, to the automobile driver or other user.

Figure 2:
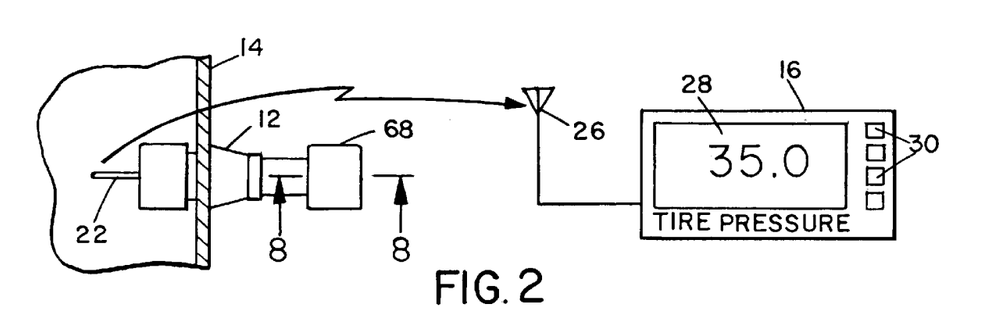
FIG. 2 is a diagrammatic illustration of the pressure measurement system, showing a tire transducer valve transmitting measured pressure to a remote receiver.
Figure 3:
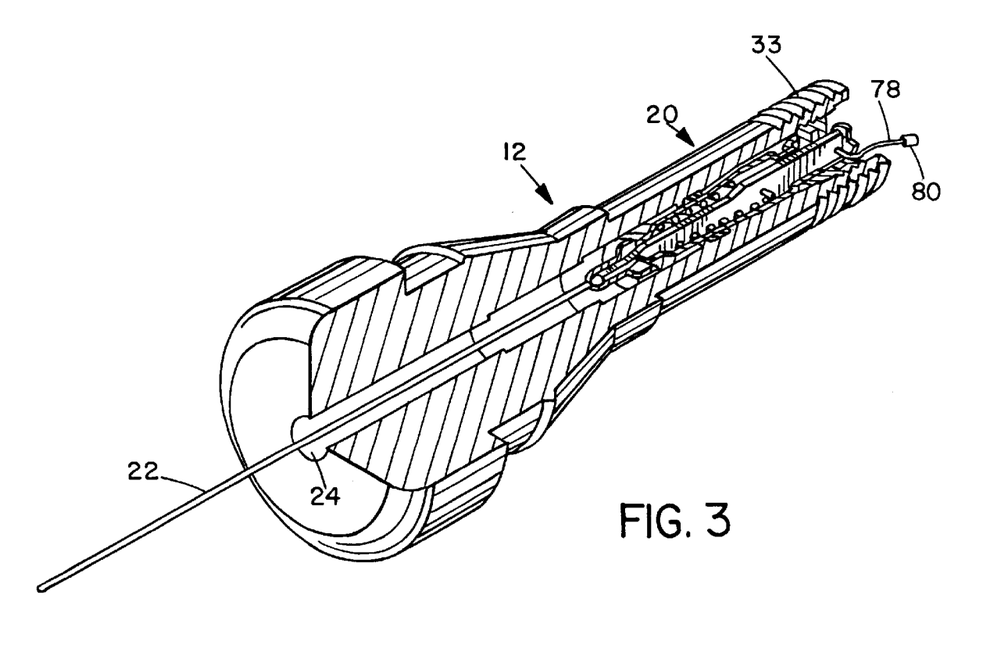
FIG. 3 is a perspective view, partially cut away, of the tire transducer valve of FIGS. 1 and 2.

As illustrated in FIG. 2, transducer valve 12 is mounted through the rim 14 in the manner of a conventional automobile tire inflation valve. Indeed, as illustrated in FIG. 3 and described below in further detail, in the illustrated embodiment of the invention it is only the valve core 18 of transducer valve 12 that measures pressure and transmits a responsive signal; the valve stem 20 that is mounted through the rim 14 is conventional in structure and function, i.e., it conforms to a suitable valve stem standard such as the U.S. Tire and Rim Association TR602HP standard. Referring to FIGS. 2 and 3, transducer valve 12 includes an antenna 22 that extends from the distal end of valve core 18 through the distal portion of the orifice 24 of valve stem 20. Via a suitable wireless transmission system, described below in further detail, signals are transmitted from antenna 22 to an antenna 26 of receiver unit 16. Antenna 26 is preferably a small printed circuit antenna mounted in the vehicle wheel well adjacent rim 14 and its tire 15 and coupled by a suitable wire or cable to receiver unit 16. Receiver unit 16 indicates the measured tire pressure on a digital display 28 in pounds per square inch, bars or other suitable units. Alternatively, receiver unit 16 may display other indications of tire pressure conditions, such as a state indication of whether the tire 15 is correctly inflated, overinflated or underinflated. Although not illustrated, receiver unit 16 may include other suitable indicators for this purpose, such as an audible indicator. Although receiver unit 16 is illustrated in the passenger compartment of automobile 10, receiver unit 16 alternatively can be hand-held by a user outside automobile 10 or other vehicle or machine. Receiver unit 16 may have switches or buttons 30 or other suitable user-operated control mechanisms for controlling its functions, such as selecting a tire 15 to monitor from among a group of two or more tires 15, e.g., four in a normal automobile, that include transducer valves 12. In such a multiple-transducer valve system, each transducer valve 12 transmits a signal to receiver unit 16 responsive to the pressure it measures. Receiver unit 16 may monitor the entire group and display indications identifying any improperly inflated tires. Although in the illustrated embodiment signal transmission is unidirectional, in other embodiments receiver unit 16 may also transmit control signals to transducer valves 12 to poll their status or operability or initiate other functions, such as power down when the vehicle is not in operation.

Figures 4, 5, 6:
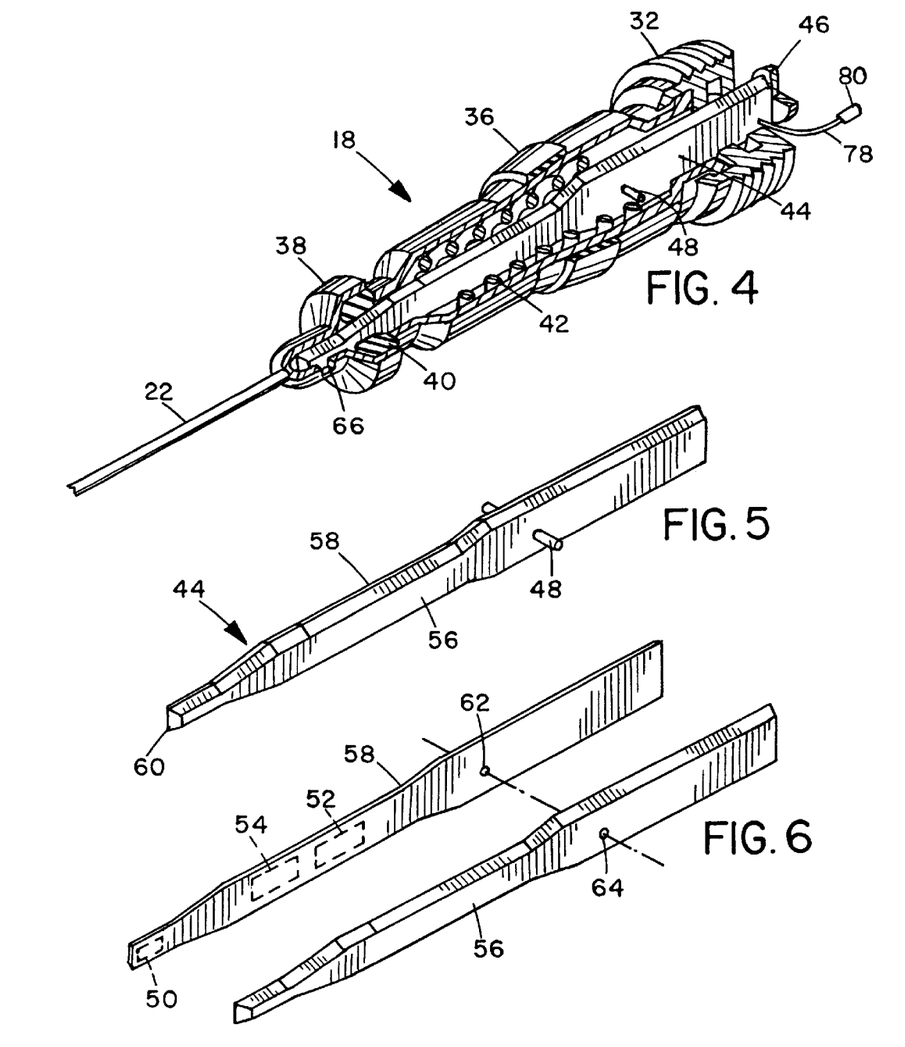
FIG. 4 is an enlarged perspective view, partially cut away, of the valve core of the tire transducer valve of FIG. 3, showing the microelectromechanical structure (MEMS) that both measures pressure and actuates the valve.
FIG. 5 is a perspective view of the MEMS.
FIG. 6 is an assembly view, similar to FIG. 5, showing the two portions of which the MEMS is composed.

Valve core 18, which is separately illustrated in FIG. 4, is mounted in valve stem 20 in the manner of a conventional valve core. That is, one inserts the distal end of valve core 18, i.e., the end from which antenna 22 extends, into the proximal end of valve stem 20 until valve core 18 is nearly fully inserted. Then, a conventional automotive valve core installation tool (not shown) is used to engage the externally threaded nut end or proximal end 32 of valve core 18 and rotate it until the threads fully engage the internally threaded proximal end 33 of valve stem 20. Valve core 18 superficially resembles a conventional automotive valve core because, like a conventional automotive valve core, it includes a barrel 34 having a portion with a tapering diameter and a generally annular gasket 36 having a tapering diameter that seals against a correspondingly tapered interior portion of valve stem 20. Valve core 18 further includes a closure cup 38, a closure cup seal 40 and a spring 42.

Further included in valve core 18 and of great importance to the present invention is a microelectromechanically structured (MEMS) pressure sensor 44. As described in further detail below, MEMS pressure sensor 44 is fabricated of silicon or similarly suitable semiconductor substrate material. Such materials are quite strong and indeed are comparable to metals such as steel in compressive strength, tensile strength and other mechanical properties. It has been critically recognized in accordance with the present invention that these properties can enable such a MEMS pressure sensor 44 to function as an integral structural member of a valve or similar mechanical structure or machine having moving parts and operable by a user. In the case of the illustrated embodiment of the invention, the mechanical structure is valve core 18. Persons skilled in the art to which the invention pertains may observe that MEMS pressure sensor 44 is disposed inside barrel 34 in substantially the same generally coaxial manner in which an actuating pin is typically disposed in a conventional automotive valve core. The distal end of MEMS pressure sensor 44 is attached to closure cup 38 in a manner similar to that in which an actuating pin of a conventional valve core is attached to a closure cup. Indeed, though it has additional pressure-sensing functions described below, MEMS pressure sensor 44 performs substantially the same mechanical function as such an actuating pin. In other words, a user can depress a pin head 46 that is bonded to the proximal end of MEMS pressure sensor 44 to actuate the valve. (Although a user could depress the proximal end of sensor 44 directly, it is more convenient for a user to apply the force to pin head 46 because it presents a larger surface.) Spring 42 resiliently biases MEMS pressure sensor 44 with respect to barrel 34 because spring 42 is captured between the narrow distal end of barrel 34 and a retaining pin 48 mounted transversely through MEMS pressure sensor 44 with respect to the longitudinal axis of sensor 44. Before a user actuates the valve, closure cup seal 40 is biased into sealing engagement with the valve seat end or distal end of barrel 34. Depressing pin head 46 urges MEMS pressure sensor 44 distally and urges closure cup 38 and closure cup seal 38 out of their sealing engagement with the distal end of barrel 34. The actuation of the valve in this manner opens a pneumatic communication path through the valve between the interior and exterior of tire 15. Thus, a user can inflate or deflate tire 15. Indeed, the force the user applies to pin head 46 may be that which the user applies by coupling a conventional tire inflation air hose chuck (not shown).

As illustrated in FIGS. 5 and 6, MEMS pressure sensor 44 includes a pressure transducer 50, pressure-sensing electronic circuitry 52 and transmission electronic circuitry 54 integrally formed on two substrates 56 and 58 made of silicon or other suitable semiconductor substrate material. Thus, in addition to its mechanical function described above, MEMS pressure sensor 44 performs the electrical functions of measuring pressure in tire 15, including generating electrical signals in response to the measured pressure for transmission to receiver unit 16. Substrates 56 and 58 are elongated and generally planar or bar-like in shape, each having an interior, generally planar surface and an opposing, exterior, generally planar surface. The interior surface of substrate 56 faces and is bonded by solder or adhesive to the interior surface of substrate 58. Although transducer 50, pressure-sensing electronic circuitry 52 and transmission electronic circuitry 54 are illustrated as disposed on an interior surface of substrate 58, as persons of skill in the art will understand the illustrated arrangement or topology is intended to be schematic in nature, and these elements may be arranged in any suitable manner including combined arrangements on either or both substrates 56 and 58. Nevertheless, pressure-sensing electronic circuitry 52 and transmission electronic circuitry 54 are preferably disposed on one or both of the facing interior surfaces because enclosing them in this manner protects them against damage. Their fabrication on substrates 56 and 58 is described in further detail below. The distal end 60 of MEMS pressure sensor 44 is metallized and attached and sealed by soldering or friction-fitting it into the narrow bulbous tip of closure cup 38. Antenna 22 is also soldered or attached in other suitable manner to the bulbous tip of closure cup 38. This structure provides a conductive path for communication of radio frequency (RF) signals between antenna 22 and transmission electronic circuitry 54. Retaining pin 48 is secured in bores 62 and 64 extending through substrates 56 and 58, respectively. An orifice 66 in closure cup 38 provides a pneumatic communication path between transducer 50 and the interior of the tire 15 while the valve is closed, thereby enabling transducer 50 to sense the air pressure in that tire.

Figure 8:
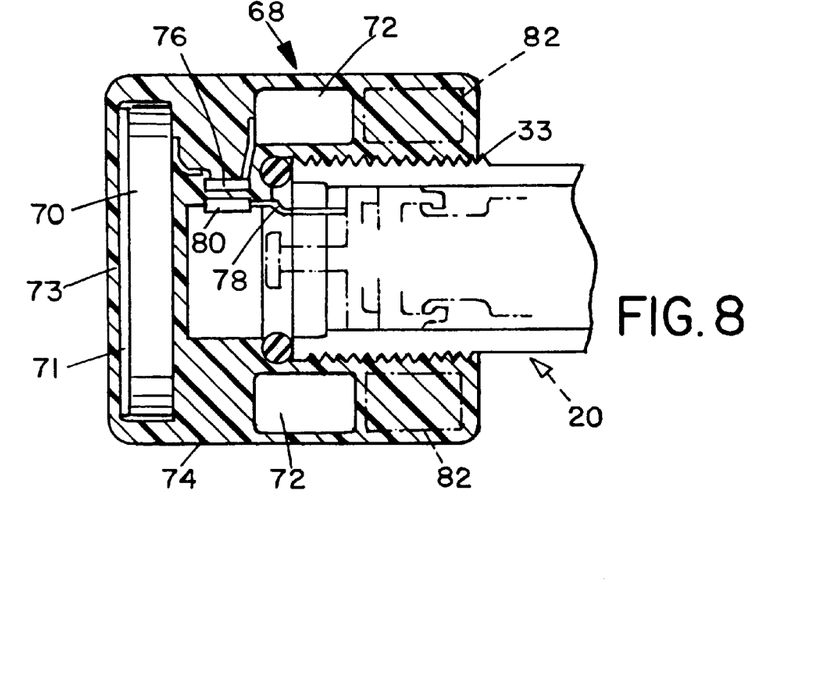
FIG. 8 is a sectional view along line 8—8 of FIG. 2, showing the cap that mounts on the end of the valve body.

As illustrated in FIG. 2, a cap 68 that threads onto proximal end 33 of valve stem 20 provides power to MEMS pressure sensor 44 and may communicate other signals with MEMS pressure sensor 44 as well. Cap 68, which is illustrated in further detail in FIG. 8, includes a battery and charging unit 70, a solar generator disc 71 electrically coupled to battery and charging unit 70, and an audible buzzer 72 or similar audible or visible indicator, all within an enclosure 74. Solar generator disc 71, which is protected by a clear plastic window 73, produces electric power when exposed to sunlight for charging the battery in battery and charging unit 70. Buzzer 72 may be generally sector-shaped or semi-annular to maximize utilization of space inside cap 68. Cap 68 provides the power signal via a flex connector 76. MEMS pressure sensor 44 receives the power signal via a flex circuit 78 and mating flex connector 80 that makes electrical contact with flex connector 76 when cap 68 is fully threaded onto proximal end 33 of valve stem 20. Flex connector 78 is bonded to metallized signal contacts or ball-grid array (BGA) solder bumps on MEMS pressure sensor 44. (See FIGS. 3–4.) An O-ring 83 in cap 68 seals against intrusion of moisture and contaminants when cap 68 is fully threaded onto proximal end 33. Although in the illustrated embodiment of the invention antenna 22 is coupled to transmission electronic circuitry 54, in other embodiments a wireless transmitter 82, comprising a RF transmitter circuit or other suitable transmitter circuit and a wire coil or similar antenna, within enclosure 74 may be coupled to transmission electronic circuitry 54 instead of antenna 22, and antenna 22 may be omitted. Enclosure 74 is thus preferably made of a suitable material transparent to RF energy, such as plastic. Although flex connectors 76 and 80 are illustrated as a means for electrically coupling cap 68 to MEMS pressure sensor 44, and a threaded connection is illustrated as a means for mechanically coupling cap 68 to valve stem 20, any suitable alternative means known in the art may be included in other embodiments. Furthermore, cap 68 may be unitary as illustrated or, alternatively, may be composed of two or more portions that couple together electrically and mechanically. For example, a first portion may thread onto valve stem 20, and a second portion may couple to the first by means of a friction-fit engagement, bayonet mount, twist-lock thread, or other suitable 20 engagement.

MEMS pressure sensor 44 may be fabricated in any suitable manner that involves a combination of integrated circuit (IC) lithographic processing and micromachining. As appreciated by persons of skill in the art, the combination of electronic and mechanical or structural features on a monolithic substrate such as silicon is perhaps the defining characteristic of a MEMS that differentiates it from an IC and from a micromachined structure.

Pressure-sensing electronic circuitry 52 and transmission electronic circuitry 54 are preferably fabricated using the well-known complementary metal-oxide semiconductor (CMOS) process. Metallized circuits of MEMS pressure sensor 44 are insulated from silicon and each other either by field and intermetal glasses of the CMOS process or by polyamide thin-film layers deposited during assembly or micromachining steps. In FIG. 6, pressure-sensing electronic circuitry 52, transmission electronic circuitry 54, and transducer 50 are illustrated in a generalized manner by areas enclosed in dashed-line because most of the actual linework and surface features formed in or deposited on substrates 56 and 58 are on the order of micrometers in size and would generally not be discernible to the naked eye. Moreover, suitable microelectronic IC topologies or layouts will occur readily to persons of skill in the art and therefore need not be described in detail in this patent specification.

Figure 7:
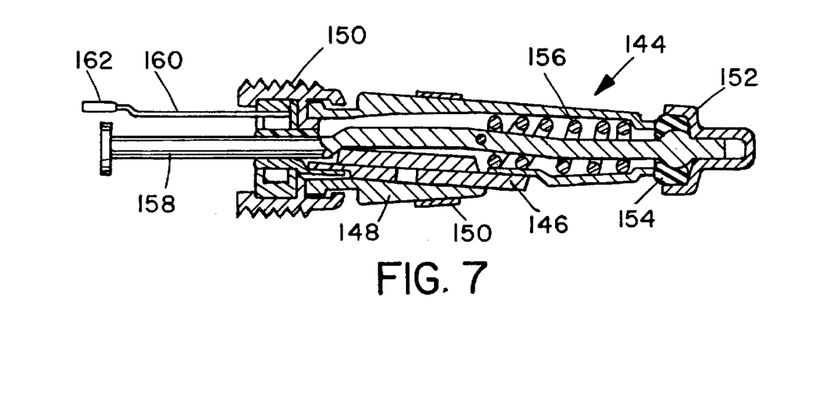
FIG. 7 is a sectional view of an alternative valve core in which a pressure-measuring MEMS is obliquely mounted through an aperture in a barrel portion of the valve core.
Figure 9:
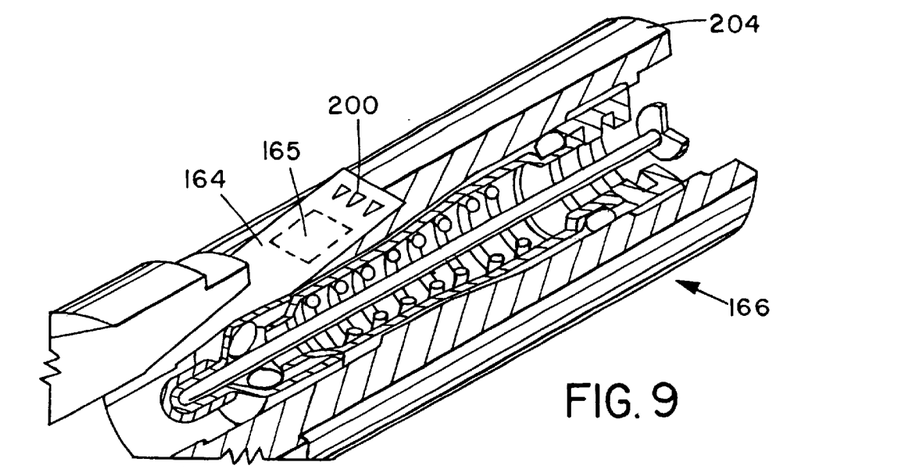
FIG. 9 is a perspective view of an alternative tire transducer valve in which a pressure-measuring MEMS is obliquely mounted through an aperture in a wall of the valve body.
Figure 14:
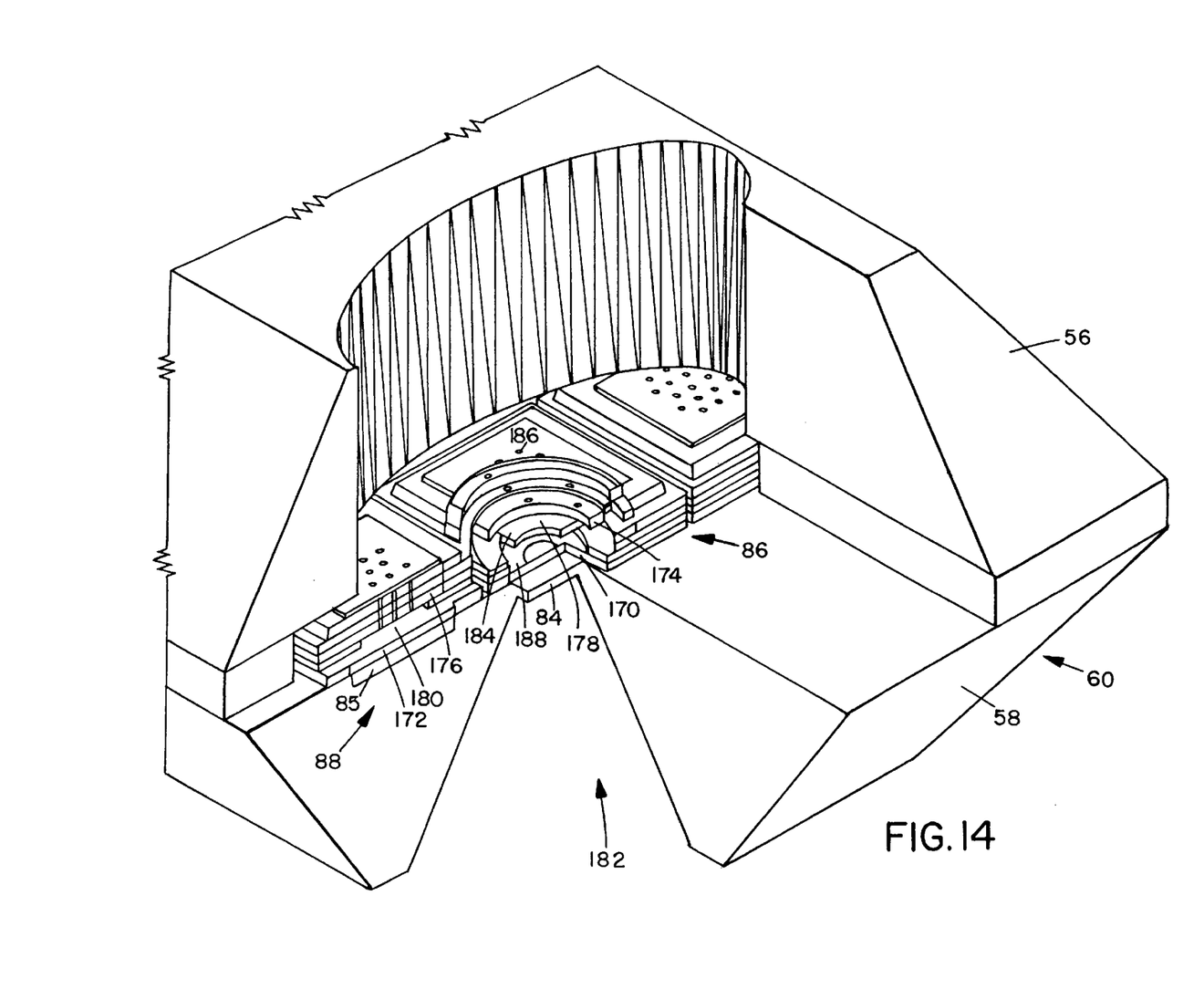
FIG. 14 is a perspective view, partially cut away, of one end of the MEMS assembly of FIG. 5 showing MEMS construction detail for a capacitive pressure transducer and a pressure port.

Persons of skill in the art will similarly be capable of producing a suitable pressure transducer 50 because MEMS pressure transducers are, in and of themselves, well-known in the art. (See, e.g., Schuenemann, et al., "A Highly Flexible Design and Production Framework for Modularized Microelectromechanical Systems," supra.) Nevertheless, it is preferred that transducer 50 be located near MEMS distal end 60 and comprise a pressure sensitive capacitor 86 and a pressure insensitive capacitor 88. In FIG. 14, an enlarged perspective view of MEMS distal end 60, partially cut away views depict MEMS construction of capacitors 86 and 88 and a pressure port 182 in communication with a diaphragm 84 that is part of pressure sensitive capacitor 86. Within the cut away perspectives of capacitors 86 and 88 at the center of the figure, dimensions perpendicular to planar substrate 58 (i.e., vertical) are exaggerated approximately 20 times greater than dimensions parallel to substrate 58 plane. The dimensional distortion enables depicting MEMS features less than 0.1 micron thick. The total thickness of all layers shown in the center is less than 6 micron. In comparison the substrates, as depicted, are each 0.250 millimeter (250 micron) thick. A typical range for silicon substrates ranges from 0.250 millimeter to 0.450 millimeter thick. FIG. 14 presents MEMS processing construction involved in three feature types that distinguish the embodiments of the present invention from typical integrated circuits. First there is the construction of a capacitive sensing MEMS transducer by surface micromachining of CMOS circuits that is presented below. Secondly, the figure depicts MEMS fabrication of a pressure inlet port for the transducer. Finally, the geometry of the MEMS assembly that makes it suitable for the embodiments shown in FIGS. 4, 7, and 9 is obtained via micromachining in contrast to typical integrated circuit packaging.

Again referring to FIG. 14, transducer 50 consists of a pressure sensitive capacitor 86 and a non-pressure sensitive reference capacitor 88. Each capacitor 86 and 88 has an electrode, 170 and 172 respectively, consisting of a thin film of polysilicon. Each capacitor also has an electrode, 174 and 176 respectively, consisting of a thin film of metal. Each capacitor has an air or vacuum gap, 178 and 180 respectively, interposed between the electrodes. The two capacitors also have additional layers of insulating glass and structural metal and silicon as necessary for the construction of capacitors 86 and 88. Capacitor 86, a pressure sensitive capacitor, has a flexible diaphragm 84 consisting of silicon and in particular a thickness of silicon defined by a CMOS N-Well deposited approximately 0.8 micron deep into a P-type semiconductor substrate 58. Underneath diaphragm 84, substrate 58 is micromachined to remove all P-type silicon thereby forming a pressure inlet port 182 for transducer 50, and thinning a 100 micron square on diaphragm 84 to approximately 0.8 microns. For anisotropic etching, inlet port 182 tapers out as a rectangle pyramid to outer dimensions of approximately 0.9 millimeter square. Gas pressure applied to diaphragm 84 urges the diaphragm and its overlying capacitor electrode 170 upwards toward electrode 174 thereby increasing the capacitance value of capacitor 86. Underneath non-pressure sensitive capacitor 88, is a similar N-Well 85 and P-type silicon of substrate 58. However P-type silicon is not removed under N-Well 85 and hence it and its overlying electrode 172 is rigidly fixed. Vacuum gap 178 and 180 are defined by MEMS processing to remove a sacrificial layer of polysilicon, for example layer 184 as shown for capacitor 86 (capacitor 88 is shown in its final form without the sacrificial polysilicon). Layers above sacrificial polysilicon contain micromachined holes 186 to allow MEMS etching materials to contact polysilicon that is removed in MEMS processing. Polysilicon and silicon that is not removed is isolated from sacrificial polysilicon by etch resisting materials, for example gate oxide 187 between polysilicon layers 170 and 184. Etch holes in these layers and in particular etch holes in metal electrodes 174 and 176 are sealed as a final step of MEMS processing to permanently fix a vacuum pressure 181 in the gap of each capacitor. The fixed vacuum pressure 181 is the reference pressure for the transducer.

Electrodes 174 and 176 (i.e., the upper electrodes of capacitors 86 and 88) are kept rigid and immoveable by means of the micromachined structures of the transducer as indicated and including the structural support of substrate 56.

The capacitance value of capacitor 86 depends in part on the spacing or gap 179 between moveable electrode 170 and fixed electrode 174. The spacing 179 is reduced by flexure of diaphragm 84 when a pressure 183 different than reference cavity vacuum pressure 181 is applied to it. Therefore increased pressure produces a capacitance increase 87, also later referred to in an equation as variable δC. The other principal parameter affecting the capacitance value of capacitor 86 is the area of overlap (variable A) between electrodes 170 and 174 which is fixed and is approximately 20,000 square microns (electrode 174 being approximately 140 microns square allowing for manufacturing tolerance in aligning port 182 with capacitor 86). Capacitor 86 therefore has a value, C, of a few picofarads and a useful pressure sensitive capacitance variation, δC, ranging up to about two picofarads. With the dimensions as described, the responsivity of capacitor 86 is approximately 0.0013 picofarad/psi at 47 psi absolute. Useful range is limited by 0.4 micron deflection of electrode 170 (i.e., gate oxide 187 on electrode 170 just touches electrode 174). Reference capacitor 88 almost exactly reproduces the construction and dimensions of capacitor 86 except that its electrodes 172 and 176 are both rigidly fixed. Substrate 58 further contains integrated analog circuits 52 connected to capacitors 86 and 88 that are arranged to produce a signal 190 (also variable δV) depending upon the difference in capacitance δC between them. Parasitic capacitance of electrodes 170 and 172 to bias voltages applied to substrate and N-Well can be on the order of tens of picofarads, but the analog circuits described below are essentially insensitive to these parasitic capacitors. The construction of capacitors 86 and 88 matches the parasitics such that differential processing can null out their effects. Most temperature dependencies of capacitance or drive signal also null out in differential processing. The signal processing may use additional matched capacitors in signal feedback circuits. Additional matched capacitors are constructed in similar fashion to fixed capacitor 88.

Advantages of using a capacitive pressure sense mechanization versus a piezo-resistive sense mechanization are low sensitivity to parasitic substrate strain, smaller transducer dimensions, wider dynamic range of pressure sensitivity, lower current (i.e., lower battery drain), less sensitivity to manufacturing tolerances. A disadvantage is non-linear function of input pressure to output voltage. The non-linear function requires digitizing the signal with an analog to digital converter (ADC) 96 having a least significant bit (LSB) 192 scaled to the reduced capacitance responsivity at lower end of the pressure range. A compensating function applied to the ADC output will produce a digital code proportional to linear pressure increase.

Figure 11:
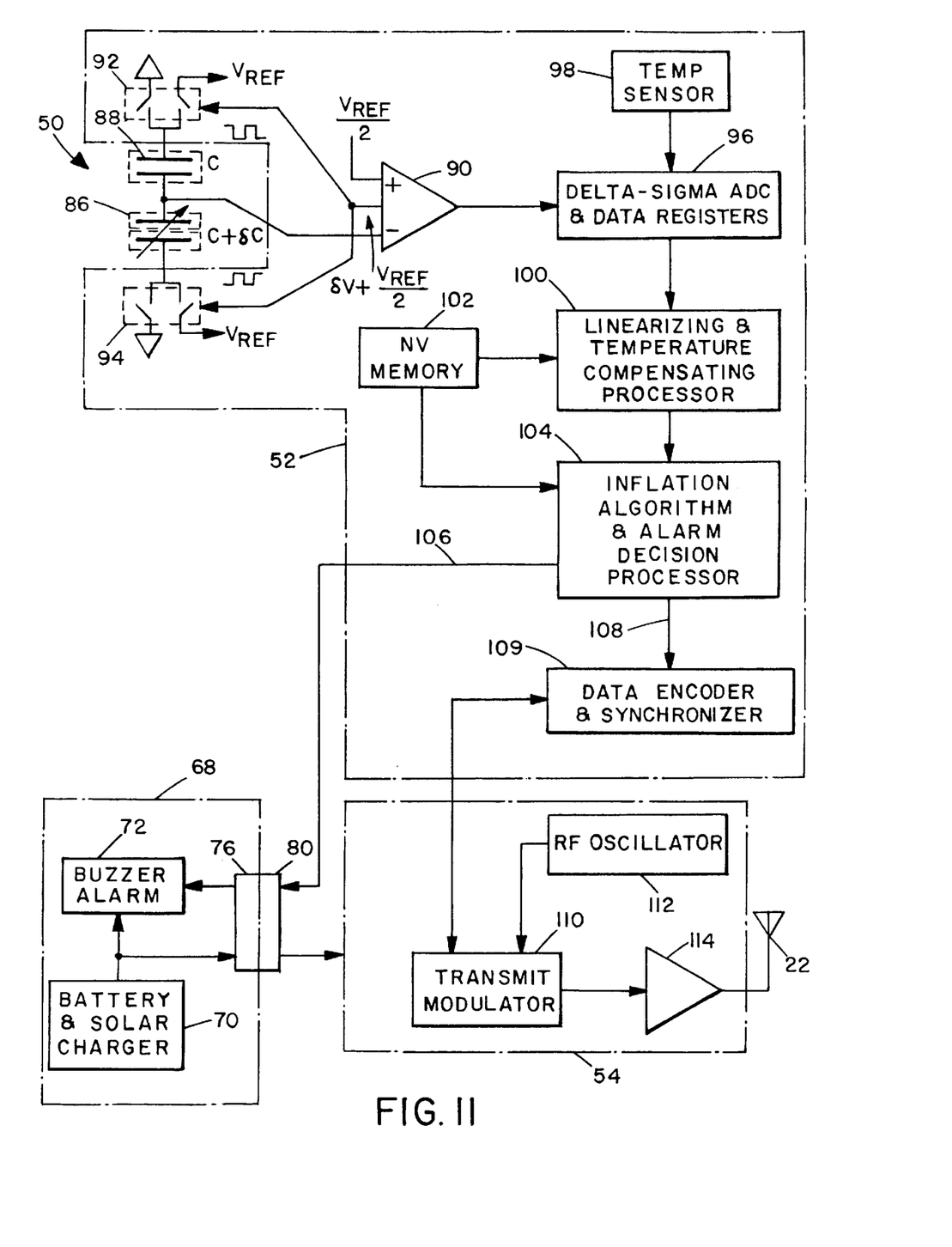
FIG. 11 is a block diagram of pressure-sensing circuitry and transmission circuitry of the MEMS that measures pressure and transmits a responsive signal to a remote location.

With further reference to FIG. 11, pressure-sensing electronic circuitry 52 includes a switched capacitor amplifier circuit that measures the capacitance of transducer 50 with respect to the fixed or predetermined capacitance of a reference capacitor 88. Reference capacitor 88 is formed at full substrate thickness rather than at n-well thickness under its polysilicon electrode. The switched capacitor amplifier circuit includes a differential amplifier 90 that controls two CMOS FET analog switch circuit 92 and 94. Switching alternately between a reference signal Vref applied to one input terminal of each switch and a ground signal applied to another input terminal of each switch produces a square wave drive signal of Vref magnitude at the output of switch 92 and 94. However the phase of switch 92 output is 180 degrees from the phase of square wave output of switch 94. Therefore the series connection of reference capacitor 88 and pressure sensitive capacitor 86 is driven with an alternating polarity square wave of magnitude Vref. When both capacitors are equal values, (i.e., zero pressure applied to capacitor 86) the node 177 common to both capacitors is a DC value 191 equal to ½ Vref. However, when the capacitance of capacitor 86 increases due to applied pressure an AC signal square wave 190 of magnitude, $\delta V$, dependent upon the ratio of capacitance values also appears on the common node. Amplifier 90 amplifies the AC component 190 of the signal. The DC component 191 of the signal (½ Vref) is canceled by biasing the positive input terminal of amplifier 90 to ½ Vref. In this manner a millivolt signal 190 responsive to pressure is amplified to full range of a delta sigma ADC 96. Frequency of the square wave is selected during design to provide optimal performance matched to the noise bandwidth characteristics of CMOS analog circuitry and AC signal operation avoids significant 1/f noise inherent in CMOS vs DC signal processing, which by nature operates in the 1/f noise bandwidth. Suitable operating frequencies include the range from 10 kHz to 1 Mhz. A temperature sensor 98 integral to pressure-sensing electronic circuitry 52 provides a signal responsive to ambient temperature that can be periodically transmitted along with the pressure measurement. A linearizing and temperature-compensating processor 100 receives the output signal of ADC 96 and, using the signal responsive to ambient temperature, compensates for the non-linear effects of environmental temperature on measured pressure. Inflation/alarm processing and data encoding will also be performed as sequential operations by the microprocessor 128. A non-volatile memory 102, such as an electrically-programmable read-only memory (EPROM or flash memory provides linearization model, Equation 1, coefficients to processor 100. In Equation 1, variable q is a computed digital value 196 that is a measurement of applied pressure 183. In Equation 1, variable ($\delta V/V_{ref}$) is the output value 194 of ADC 96 and coefficients $a_i$ are experimental calibration values or are algebraically determined from the physical parameters of the pressure sensor. In the latter case, equation 1 is a Taylor series expansion of a solution equation for pressure q as a function of sensor parameters and output voltage 190, variable $\delta V$. Coefficients $a_i$ are functions of the sensor parameters. The derivation of Equation 1 follows. Equation 2 presents the capacitive difference 87, variable $\delta C$, between variable capacitor 86 and reference capacitor 88. The first term in Equation 2 is the equation for total capacitance of capacitor 86 as a function of applied pressure q, capacitor geometry (gap spacing, d, diaphragm dimension, a, and thickness, h) and substrate 58 material properties ($E_{si}$, $v_{si}$, and $\epsilon_{res}$). The second term is the standard capacitance formula for a fixed gap parallel plate capacitor. It gives the fixed value 89, variable C, of capacitor 88 as a function of capacitor geometry (gap spacing, d, and overlapping plate area, A). Equation 3 is the relationship of AC transducer signal 190, variable $\delta V$, as developed by switches 92 and 94 and capacitors 86 and 88. The transducer signal is a function of capacitance difference $\delta C$, Vref, and C, the reference capacitor value. Equation 4 is the solution of Equation 3 for $\delta C$ equated to the right hand side of Equation 2. Derivation of Equation 1 is algebraic manipulation of Equation 4 in three steps. First, solve Equation 4 for variable q as a function of variables $\delta V$, $V_{ref}$, capacitor geometry parameters and substrate material properties. Next expand the right hand side of the solution for q as a Taylor series of sufficient order. The result is an expression for q as a power series in variable ($\delta V/V_{ref}$). Algebraic expressions for Equation 1 coefficients $a_i$ as functions of capacitor geometry and substrate material parameters are obtained by inspection of the Taylor series expansion. Nominal coefficients are calculated from design parameters. Improved accuracy can be obtained by recalculating coefficients to account for manufacturing variations in CMOS and MEMS processes. Upon calibration of variable silicon properties and manufacturing variance of geometry for a CMOS and MEMS fabrication run, the coefficients can be re-calculated and programmed into non-volatile memory 102.

$$q = a_1 \cdot \frac{\delta V}{V_{ref}} + a_2 \cdot \left(\frac{\delta V}{V_{ref}}\right)^2 + a_3 \cdot \left(\frac{\delta V}{V_{ref}}\right)^3 + a_4 \cdot \left(\frac{\delta V}{V_{ref}}\right)^4 \quad \text{Equation 1}$$

$$\delta C = \varepsilon_0 \cdot \left[\frac{A}{d - \frac{k_1 \cdot q \cdot a^4}{k_2 \cdot h^3 + k_3 \cdot h \cdot a^2}}\right] - \varepsilon_0 \cdot \frac{A}{d} \quad \text{Equation 2}$$

$$k_1 = 1.52 \cdot 10^{-2} \cdot (1 - v_{Si}^2)$$

$$k_2 = E_{Si}$$

$$k_3 = \frac{9}{4 \cdot \pi^2} \cdot E_{Si} \cdot \varepsilon_{res} \cdot (1 + v_{Si})$$

$$\delta V = \frac{\delta C \cdot V_{ref}}{2C + \delta C} \quad \text{Equation 3}$$

$$\frac{A \cdot \varepsilon_0}{d - \frac{k_1 \cdot q \cdot a^4}{k_2 \cdot h^3 + k_3 \cdot h \cdot a^2}} - \frac{A \cdot \varepsilon_0}{d} = \frac{-2 \cdot \delta V \cdot A \cdot \varepsilon_0}{d \cdot (\delta V - V_{ref})} \quad \text{Equation 4}$$

An inflation algorithm and alarm decision processor 104 receives the output signal of processor 100 and, in response, determines whether tire 15 (FIG. 1) is properly inflated, overinflated or underinflated. Memory 102 also provides inflation model coefficients to processor 104. A simplified model of inflation pressure versus temperature can assume constant tire volume using the ideal gas law that relates volume and absolute pressure product to the absolute temperature of the gas under pressure. However, a more accurate inflation model also accounts for the elasticity of tire sidewalls by relating the volume of a tire as a variable dependent upon the pressure inside the tire. If tire 14 is not properly inflated, processor 104 produces an alarm signal 106 that activates audible buzzer 72 in cap 68 to alert the vehicle driver or other personnel. Battery and charging unit 70 provides electrical power to buzzer 72 and to all active electronic components of pressure-sensing electronic circuitry 52 and transmission electronic circuitry 54.

Processor 104 also produces an output signal 108 corresponding to the measured tire pressure. A data encoder and synchronizer 109 serializes output signal 108 using Manchester or bi-phase encoding and provides the serialized data signal to a transmit modulator 110. Modulator 110 modulates a carrier signal produced by a RF oscillator 112 with the serialized data signal and provides the modulated signal to a RF amplifier 114. The output of amplifier 114 is coupled to antenna 22, which radiates the signal for remote reception by receiver unit 16 (FIGS. 1–2). Although not illustrated, signal 108 may also be provided to a contact of flex connector 80 for electronic diagnostic or other purposes.

Figure 12:
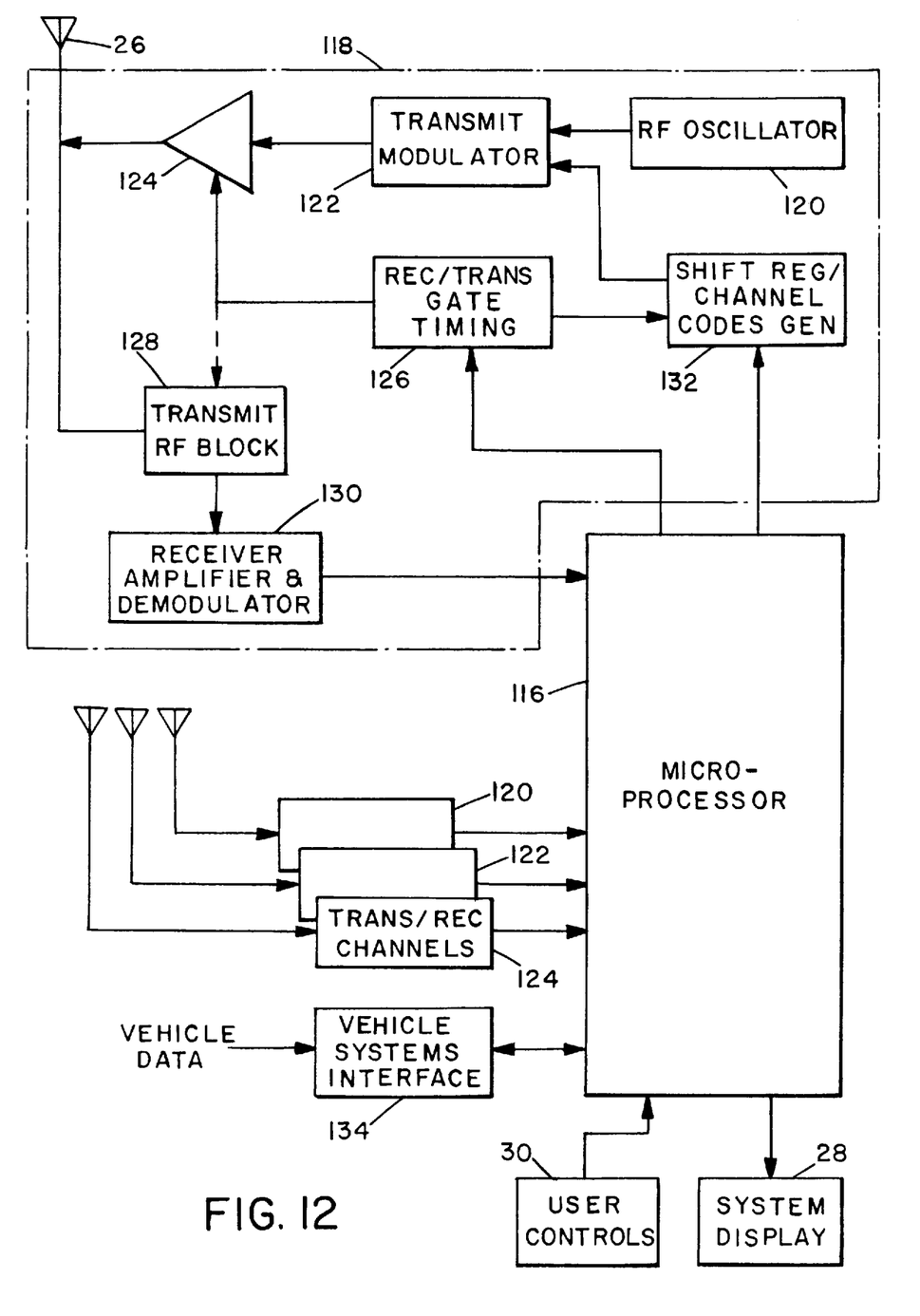
FIG. 12 is a block diagram of circuitry of a remote receiver.

FIG. 12 illustrates receiver unit 16. A microprocessor 116 performs the majority of the processing. As noted above, receiver unit 16 can communicate with several transducer valves 12. Microprocessor 116 is coupled to several transmit/receive channels 118, 120, 122 and 124, each of which communicates with one of transducer valves 12 using a unique frequency or other suitable selectivity parameter. Because transmit/receive channels 118, 120, 122 and 124 are identical but for the frequency or other selectivity parameter, only transmit/receive channel 118 is shown in detail and described. An alternative means for providing selectivity using only a single transmit/receive channel could involve each transducer valve 12 transmitting a code or serial number from which receiver unit 16 can identify it and its location on the vehicle.

Transmit/receive channel 118 includes a printed antenna 26 that can be mounted in the vehicle's wheel well near a tire (see FIG. 1), a RF oscillator 120, a RF transmit modulator 122, a RF transmitter amplifier 124, a receive/transmit gate timing circuit 126, a transmit RF blocking circuit 128, and a receiver amplifier and demodulator 130. A shift register/channel code generator 132 outputs data for modulation by transmit modulator 122. Microprocessor 116 is a conventional microprocessor circuit with a memory (including some amount of non-volatile memory), a CPU, input/output circuits, data and address busses, and timing/interrupt circuits. It interfaces with a control buttons 30 and system display 28. (See FIG. 2.) These are preferably conventional, commercially available display and switch panels. Finally, a vehicle systems interface 134 is provided for interfacing with existing vehicle displays and data sources to receive information such as vehicle speed, distance traveled, and gas mileage. As described below, such information can be used to compute optimal tire inflation pressures and other information.

A bidirectional (i.e., transmit/receive) implementation of communication of the transducer with its system affords several benefits. In a case where there is a high density of similar systems employed on vehicles, each transducer can be made to synchronize its output transmission to a remote unit's specific query by transmitting only upon first receiving its unique serial number transmitted by the remote unit. In this manner, interfering signal transmissions can be reduced. Additionally, a remote receiver that can also transmit to bidirectional transducers can command useful modes in the transducer—modes such as built-in-test, transducer power down (sleep) while vehicle is not in operation, and others.

Figure 13:
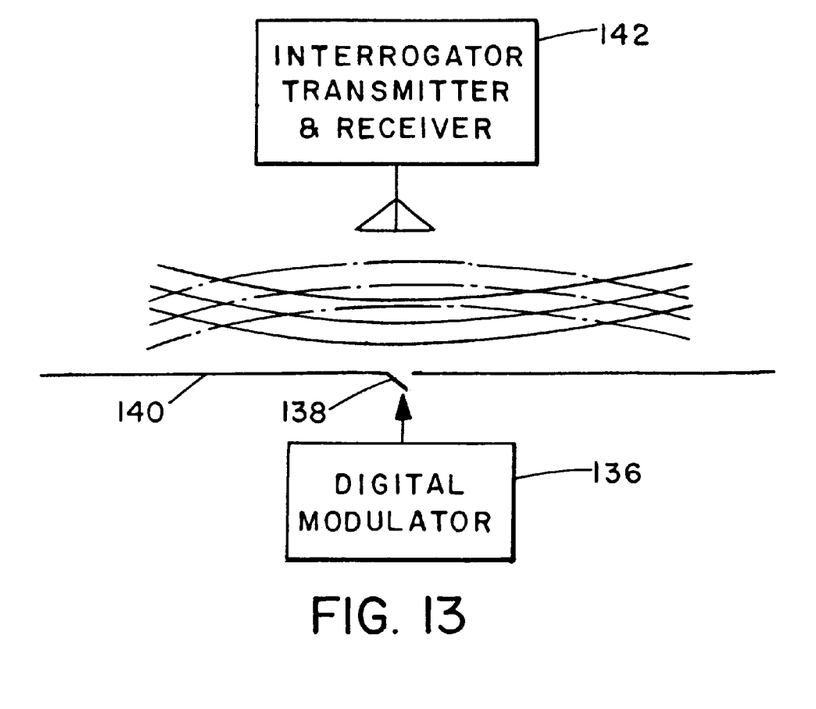
FIG. 13 is a diagrammatic illustration of alternative communication circuitry in which remote receiver circuitry interrogates passive transmitter circuitry.

FIG. 13 illustrates an alternative transmission system to that described above. In the above-described system, transducer valve 12 actively transmits a modulated RF carrier, which receiver unit 16 receives and demodulates. In contrast, in the system illustrated in FIG. 13, a digital modulator 136 included in an alternative transducer valve (FIG. 9) modulates a switch 138 to change the state of an antenna 140 from that of a RF energy dissipator to that of a RF energy reflector. Switch 138 selectively couples two halves of a antenna 138 to one another. Thus, when switch 138 is open, antenna 140 appears as a quarter-wave dipole matched to free-space impedance that dissipates RF energy. When switch 138 is closed, the antenna halves are shorted together, and antenna 140 appears as a half-wave reflector that reflects RF energy. By selectively modulating switch 138 in response to the information to be transmitted, the transducer valve can passively transmit the information to an interrogator transmitter and receiver 142. Interrogator transmitter and receiver 142 can detect the changes in RF energy and recover the information. A similar "modulated backscatter" method of communication has been commercially employed by Micron Communications, Inc in their MicroStamp® RFID product. Switch 138 may be either a micromachined switch or a semiconductor switch either integrated the MEMS pressure sensor or a separate device. An alternative valve core 144 is illustrated in FIG. 7. Valve core 144 may be included in a transducer valve (not shown) that is otherwise identical to transducer valve 12 described above. In contrast to valve core 18 of transducer valve 12, valve core 144 includes a MEMS pressure sensor 146 that extends at least part way through an aperture in the barrel 148. MEMS pressure sensor 146 is similar to MEMS pressure sensor 44 described above in that it is elongated and bar-like in shape and includes a similar transducer and pressure-sensing circuit (not shown). MEMS pressure sensor 44 extends through the aperture at an oblique angle with respect to the wall of barrel 148. In other words, the longitudinal axis of sensor 44 intersects the longitudinal axis of valve core 144 at an angle between zero and 90 degrees, and preferably about 40 degrees. Valve core 144 is also similar to valve core 18 in that it includes an externally threaded nut end or proximal end 150, an annular gasket 152 of tapering diameter that seals against a correspondingly tapered interior portion of valve stem 20 (see FIG. 3), a closure cup 152, a closure cup seal 154 and a spring 156. An actuating pin 158 extends generally coaxially within barrel 156 and has a distal end attached to closure cup 152 and a proximal end extending beyond proximal end 150. Actuating pin 158 is thus similar in structure and function to a conventional automotive valve core actuating pin, although actuating pin 158 preferably has a slight bend to accommodate MEMS pressure sensor 144. As in above-described valve core 18, valve core 144 further includes a flex circuit 160 and 162 for coupling electrical signals to cap 68 (see FIG. 8). Because in this embodiment MEMS pressure sensor 146 is not directly coupled to an antenna and has no integral transmission circuit, wireless transmitter 82 of cap 68 transmits the pressure and temperature measurement signals. A transducer valve having valve core 144 operates in the same manner as transducer valve 12 described above.

In another alternative embodiment (FIG. 9), a transducer valve 160 has a conventional valve core 162, but the MEMS pressure sensor 164 is included in the valve stem 166. MEMS pressure sensor 164 is similar to the MEMS pressure sensors described above in that it is elongated and bar-like in shape and includes a similar transducer and pressure-sensing circuit (not shown). MEMS pressure sensor 164 extends through the aperture at an oblique angle with respect to the wall of valve stem 166. In other words, the longitudinal axis of sensor 164 intersects the longitudinal axis of valve stem 166 at an angle between zero and 90 degrees, and preferably about 11°.

Figure 10:
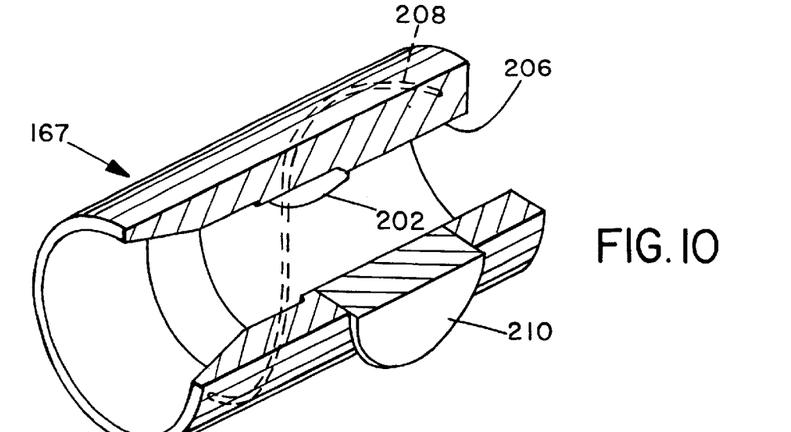
FIG. 10 is a perspective view, partially cut away, of a sleeve that mounts on the valve stem of FIG. 9.
Figure 10A:
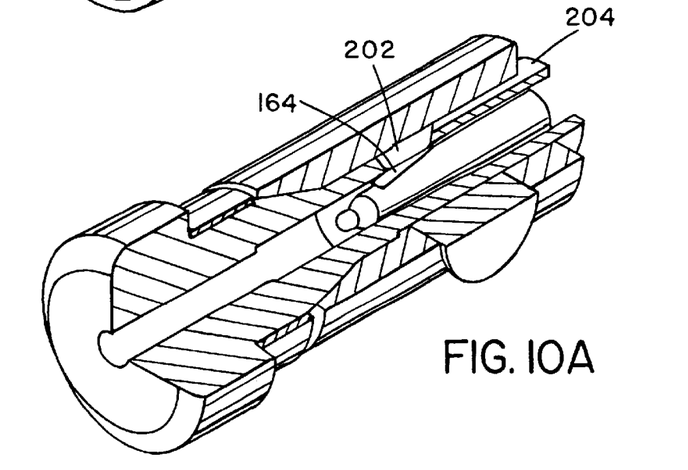
FIG. 10A is a perspective view, partially cut away, of the valve stem of FIG. 9 and the sleeve of FIG. 10 assembled.

FIG. 9 depicts a MEMS pressure sensor assembly 164 with three contacts 200 on the proximal end of the assembly. The contacts can provide operating power and provide pressure and temperature signal output RF modulation. The contacts are wiped by three spring finger contacts 202 on inside of a sleeve 167 (FIG. 10) upon installation of sleeve 167 over stem 166. After installation electrical contact in maintained through the spring force. The proximal end of the valve stem 166 is trimmed with a flat 204 to clear the sleeve's spring contacts 202 and also to serve as a positioning guide for aligning the contacts. The inside proximal surface of the sleeve has a matching flat 206 that snugly fits the flat on the stem such that the sleeve contacts are aligned with the MEMS assembly contact. A wire 208 functioning as an RF antenna spirals around the sleeve (approximately one turn from proximal to distal end) and is connected to the RF contact of the MEMS assembly by means of a spring finger contact. A battery 210 contained in the sleeve provides DC power to the MEMS assembly through the two remaining contacts. FIG. 10A depicts sleeve 167 assembled over stem 166.

The preferred antenna 208 in the sleeve 167 is a modulated backscatter antenna. FIG. 13, the backscatter diagram, shows a modulated switch 165, which alternatively may be the active transmitter. The passive approach is considered to be one of the easiest ways to implement the function. The system can have either an active transmit circuit or a passive transit circuit.

The present invention provides electronic pressure measurement in valves and other mechanical structures by integrating the pressure transducer with its associated circuitry in a MEMS and integrating the MEMS in a novel manner within the structure. In accordance with one aspect of the invention, the MEMS not only is integrated electronically within the structure but also is integrated mechanically by functioning as a user-operable actuator for the structure. For example, the MEMS may function as an actuator pin in a valve. In accordance with another aspect of the invention, the MEMS is integrated with the structure by mounting it through an opening in a curved wall of the structure at an oblique angle. For example, the MEMS may be mounted through the wall of a valve core or a valve stem. Furthermore, although in the above-described exemplary embodiments of the invention the valve is an automotive-type tire inflation valve, the valve can be of any suitable type, such as a refrigeration valve through which refrigeration systems are charged with refrigerant.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A transducer apparatus, comprising:
 a mechanical structure operable by a user, the mechanical structure comprising a valve core of a valve, the valve core comprising an elongate barrel having a through bore, a proximal end, and a distal end, and a valve cup in said barrel movable between a first, open position and a second, closed position closing said valve; and
 a movable actuating pin extending through said barrel between said proximal and distal ends of said barrel and being coupled to said valve cup at said distal end of said barrel, said actuating pin having a proximal end protruding from said proximal end of said barrel, said movable actuating pin of said valve movable with respect to said barrel by a user engaging the proximal end of said actuating pin to move said valve cup to said open position, said actuating pin being formed substantially entirely by a microelectromechanical structure (MEMS) having a pressure transducer and pressure-sensing electronic circuitry integrally formed together on a semiconductor substrate for measuring a pressure.

2. A transducer apparatus comprising:
 a mechanical structure operable by a user; and
 a movable member cooperatively coupled to said mechanical structure for actuating said mechanical structure, said movable member and said mechanical structure selectably movable with respect to one another by a user to actuate said mechanical structure, said movable member comprising a microelectromechanical structure (MEMS) having a pressure transducer and pressure-sensing electronic circuitry integrally formed together on a semiconductor substrate for measuring a pressure;
 said movable member comprising first and second semiconductor substrates, each having a fabricated side on which is formed at least a portion of said MEMS, said substrates attached to one another with said fabricated side of said one substrate facing said fabricated side of said other substrate.

3. The transducer apparatus recited in claim 1, wherein said MEMS further has formed on it a transmission circuit transmitting a signal responsive to said pressure to a remote location.

4. The transducer apparatus recited in claim 3, wherein said transmission circuit transmits wirelessly.

5. A transducer apparatus comprising:
 a mechanical structure operable by a user;
 a movable member cooperatively coupled to said mechanical structure for actuating said mechanical structure, said movable member and said mechanical structure selectably movable with respect to one another by a user to actuate said mechanical structure, said movable member comprising a microelectromechanical structure (MEMS) having a pressure transducer and pressure-sensing electronic circuitry integrally formed together on a semiconductor substrate for measuring a pressure;
 said MEMS further having formed on it a wireless transmission circuit for transmitting a wireless signal responsive to said pressure to a remote location; and
 said transmission circuit comprising an antenna having a wavelength modulated in response to said pressure for transmitting passively.

6. A transducer valve, comprising:
 a valve core mountable in a passage between an interior and an exterior of a pressure container for sensing pressure of a fluid in said interior, the valve core being elongated and having a central longitudinal axis; and
 a movable member comprising an actuator pin of elongated shape having a longitudinal axis disposed generally coaxially with the longitudinal axis of said valve core to extend through said valve core, said actuator pin selectively movable by a user engaging an end of said actuator pin protruding from said valve core between a closed position in which a portion of said actuator pin is in sealing engagement with a portion of said valve core to prevent fluid flow through said passage and an open position in which said portion of said actuator pin is not in sealing engagement with said portion of said valve core to allow fluid flow through said passage, said actuator pin being formed substantially entirely by a microelectromechanical structure (MEMS) having a pressure transducer and pressure-sensing electronic circuitry integrally formed on a semiconductor substrate.

7. A transducer valve, comprising:

a body mountable in a passage between an interior and an exterior of a pressure container for sensing pressure of a fluid in said interior;

a movable member at least partially within said body, said movable member selectively movable by a user between a closed position in which a portion of said actuator pin is in sealing engagement with a portion of said body to prevent fluid flow through said passage and an open position in which said portion of said actuator pin is not in sealing engagement with said portion of said body to allow fluid flow through said passage, said movable member comprising a microelectromechanical structure (MEMS) having a pressure transducer and pressure-sensing electronic circuitry integrally formed on a semiconductor substrate; and said movable member comprising first and second semiconductor substrates, each having a fabricated side on which is formed at least a portion of said MEMS, said substrates attached to one another with said fabricated side of said one substrate facing said fabricated side of said other substrate.

8. The transducer apparatus recited in claim 6, wherein said MEMS further has formed on it a transmission circuit transmitting a signal responsive to said pressure to a remote location.

9. A transducer valve, comprising:

a body mountable in a passage between an interior and an exterior of a pressure container for sensing pressure of a fluid in said interior;

a movable member at least partially within said body, said movable member selectively movable by a user between a closed position in which a portion of said actuator pin is in sealing engagement with a portion of said body to prevent fluid flow through said passage and an open position in which said portion of said actuator pin is not in sealing engagement with said portion of said body to allow fluid flow through said passage, said movable member comprising a microelectromechanical structure (MEMS) having a pressure transducer and pressure-sensing electronic circuitry integrally formed on a semiconductor substrate; and said MEMS further having formed on it a transmission circuit transmitting a signal responsive to said pressure to a remote location;

said transmission circuit transmitting wirelessly.

10. The transducer apparatus recited in claim 9, wherein said transmission circuit comprises an antenna having a wavelength modulated in response to said pressure for transmitting passively.

11. The transducer apparatus recited in claim 6, wherein said valve is a tire inflation valve, and said user moving said MEMS axially between said open and closed positions opens and closes said tire inflation valve.

12. The transducer apparatus recited in claim 11, wherein said valve core has a proximal end and a distal end and includes a barrel, a cup, and a spring, said barrel has a proximal end and a distal end, and said MEMS extends through said barrel between said proximal and distal ends of said barrel and has a distal end connected to said cup at said distal end of said barrel and has a proximal end protruding from said proximal end of said barrel, and said spring biases said cup into sealing engagement with said distal end of said barrel.

13. The transducer apparatus recited in claim 12, wherein:

said MEMS further has formed on it a transmission circuit wirelessly transmitting a signal responsive to said pressure to a remote location; and said valve core includes an antenna electronically coupled to said distal end of said MEMS and extending from said distal end of said valve core.

14. A transducer apparatus, comprising:

a structure having a curved wall with an aperture between opposing sides of said wall; and a microelectromechanical structure (MEMS) having a pressure transducer and pressure-sensing electronic circuitry integrally formed on a semiconductor substrate, said MEMS mounted to said structure and extending at least part way through said aperture at an oblique angle with respect a line parallel to a portion of said wall, said MEMS measuring pressure on one side of said wall with respect to pressure on an opposite side of said wall.

15. The transducer apparatus recited in claim 14, wherein said structure is a valve core of a vehicle tire inflation valve, said MEMS has an elongated shape and is disposed through an aperture in a generally tubular barrel portion of said valve core.

16. The transducer apparatus recited in claim 14, wherein said MEMS further has formed on it a transmission circuit transmitting a signal responsive to said pressure to a remote location.

17. The transducer apparatus recited in claim 16, wherein said transmission circuit transmits wirelessly.

18. The transducer apparatus recited in claim 17, wherein said transmission circuit comprises an antenna having a wavelength modulated in response to said pressure for transmitting passively.

19. A transducer apparatus, comprising:

a mechanical structure operable by a user; and a movable member cooperatively coupled to said mechanical structure for actuating said mechanical structure, said movable member and said mechanical structure selectably movable with respect to one another by a user engaging said movable member to actuate said mechanical structure, said movable member being formed substantially entirely by a microelectromechanical structure (MEMS) having a pressure transducer and pressure-sensing electronic circuitry integrally formed together on a semiconductor substrate for measuring a pressure.

20. A transducer apparatus, comprising:

a mechanical structure operable by a user; and a movable member cooperatively coupled to said mechanical structure for actuating said mechanical structure, said movable member and said mechanical structure selectably movable with respect to one another by a user to actuate said mechanical structure, said movable member transferring an actuating force between said member and said structure when operated by a user, said movable member being formed substantially entirely by a micromechanical structure (MEMS) having a transducer and transducer electronic circuitry integrally formed together on a semiconductor substrate.

21. The transducer apparatus of claim 21, wherein; said transducer comprises a pressure transducer.

* * * * *